United States Patent [19]
Miyazawa

[11] Patent Number: 5,883,729
[45] Date of Patent: Mar. 16, 1999

[54] SCANNER DEVICE

[75] Inventor: Azuma Miyazawa, Mitaka, Japan

[73] Assignee: Olympus Optical Co., Ltd., Tokyo, Japan

[21] Appl. No.: 594,939

[22] Filed: Jan. 31, 1996

[51] Int. Cl.[6] .............................. H04N 1/04; H04N 1/46; H04N 5/225; H04N 5/228
[52] U.S. Cl. ..................... 358/506; 358/505; 358/474; 358/539; 358/909.1; 348/220; 348/222; 396/320; 396/387
[58] Field of Search ....................... 358/505, 506, 358/474, 524, 527, 530, 539, 448, 487, 534, 909.1; 348/222, 739, 96, 97, 98, 220, 441, 458, 459; 396/311, 320, 387, 406, 395; 395/106, 800.41

[56] References Cited

U.S. PATENT DOCUMENTS

| | | | |
|---|---|---|---|
| 4,082,446 | 4/1978 | Driscoll et al. | 396/30 |
| 4,506,300 | 3/1985 | Fearnside | 348/110 |
| 4,656,525 | 4/1987 | Norris | 358/487 |
| 5,508,825 | 3/1991 | Kataoka | 358/474 |
| 5,565,912 | 2/1994 | Easterly et al. | 348/96 |
| 5,633,733 | 8/1995 | Miyazawa | 358/527 |
| 5,706,050 | 12/1994 | Nishimura et al. | 348/97 |

FOREIGN PATENT DOCUMENTS 4-68877  3/1992  Japan .

*Primary Examiner*—Kim Yen Vu
*Assistant Examiner*—Kimberly A. Williams
*Attorney, Agent, or Firm*—Louis Weinstein

[57] ABSTRACT

A scanner device including a line sensor, an AD conversion circuit for AD-converting an inputted image signal, a memory for storing therein a digital signal which is outputted from the AD conversion circuit, a DA conversion circuit for DA-converting the digital signal which is stored in the memory, an encoder for executing conversion to a video signal on the basis of an output from the DA conversion circuit, and a controller for outputting an image signal which is outputted from the line sensor, to digital RGB data which are more in the number of picture elements than the number of stored picture elements of the memory by the auxiliary utilization of said memory. Thus, the scanner device makes it possible to execute video output with respect to a domestic television monitor, although the scanner device is a scanner having high resolution, and further, at a reduced memory capacity.

28 Claims, 16 Drawing Sheets

SCANNER DEVICE

BACKGROUND OF THE INVENTION

1. Field of the Invention:

The invention relates to scanner devices, particularly, to a scanner device which has a video-signal output part so as to be capable also of outputting an image signal which is higher in resolution.

2. Related Art Statement

A film video player which has already been disclosed in U.S. Pat. No. 4,506,300 (Japanese Patent Publication No. HEI 4-11072 (11072/1992)) relates to a technique in which a contrivance is made such that an image on a silver-salt film is converted to a video signal, and perforations or the like in the film upon conversion do not appear on a display monitor.

Further, a scanner device disclosed in Japanese Patent Unexamined Publication No. HEI 4-68877 (68877/1992) is a device in which image data which are inputted by a line sensor are AD converted (ANALOG-DIGITAL converted), the image data are once stored in a frame memory, thereafter, the image data are DA converted (DIGITAL-ANALOG converted), a synchronizing signal is added thereto, and this resulting signal is converted to an image signal. This device has also a digital output, and is a device which is capable of executing outputting to both a television and a personal computer.

However, as to the description concerning the film video player in U.S. Pat. No. 4,506,300, there is no technical description of the fact other than a method of converting the image on the film to the video signal.

Moreover, in the scanner device in Japanese Patent Unexamined Publication No. HET 4-68877 (68877/1992), an assumption is made to an image signal for hi-vision. An example in which the image signal is outputted to the domestic monitor is not concretely shown. A capacity of the frame memory is not touched to the scanner device. However, it is estimated that an extremely high or large memory capacity will be required in order to get image data of high resolution.

OBJECT AND SUMMARY OF THE INVENTION

It is an object of the present invention is to provide a scanner device of high resolution, which outputs an image signal of an image on a developed film, and further, which is provided with a memory of smaller capacity, so that the scanner device is capable of outputting a video signal with respect to, for example, a domestic television monitor or the like.

According to the invention, there is provided a scanner device which comprises image input means having a line sensor for converting an image on a developed film, to an image signal, AD conversion means for converting, in analog-digital form, said image signal, memory means for storing a signal which is converted to digital from, encoder means for executing conversion to a video signal on the basis of a stored digital signal, and RGB data means for outputting RGB data on the basis of said image signal from said image input means every line of said line sensor, wherein said RGB data are capable of outputting digital RGB data without the intervention of the memory means, or which are greater in the number of picture elements than the number of picture elements capable of being stored in said memory means.

In connection with the above, the other features and advantages of this invention will sufficiently become apparent by the following description.

DETAILED DESCRIPTION OF THE PREFERRED EMBODIMENTS

Prior to the detailed description of various embodiments according to the invention, a description will first be made of a summary of a scanner device according to a present embodiment by the use of a block diagram arrangement view in FIG. 1.

Figure 1:
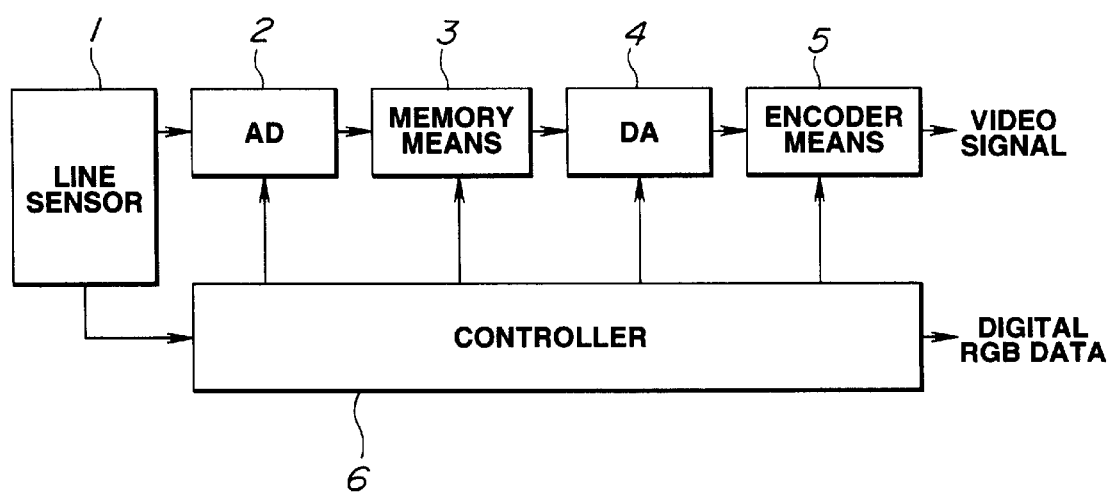
FIG. 1 is a block diagram arrangement view showing a summary of a scanner device according to the invention.

The scanner device according to the present invention comprises image input means 1 which includes a line sensor as shown in the block diagram arrangement view in FIG. 1, AD conversion means 2 for AD-converting an image signal which is outputted from the image input means, memory means 3 for storing therein a digital signal which is outputted from the AD conversion means, DA conversion means 4 for DA-converting the digital signal which is read from the memory means 3, encoder means 5 for converting the digital signal to a video signal on the basis of an analog signal which is outputted from the DA conversion means 4, and a controller 6 serving as RGB output means for outputting the image signal which is outputted from the image input means 1, to output digital RGB data which are greater in the number of picture elements than the number of picture elements which is capable of being stored in said memory means, without the intervening of the memory means, or by the auxiliary utilization of the memory means.

The scanner device according to the invention, which has the arrangement shown in FIG. 1, takes in or fetches an image on a developed film by the fact that the image on the developed film is scanned by the line sensor of the image input means 1. The image is once stored in the memory means 3 as being the image signal. The image signal is converted to a video signal for a monitor such as a television or the like by the encoder means 5 and is outputted.

Moreover, the image signal comprises image data which are formed by R, G and B signals having high resolution of the number of picture elements greater than the number of picture elements which is capable of being stored in the memory means 3 through the controller 6. The image signal is converted to digital RGB data corresponding to those for a personal computer or the like, and is outputted.

In the present device, the memory capacity of the memory means 3 may only be a capacity for the video signal. Accordingly, the memory capacity of the memory means 3 may be sufficient to have of the order of 200 thousand picture elements ~400 thousand picture elements, i.e. of a relatively small capacity.

Furthermore, in the present device, in a case where the digital RGB data are outputted, the memory means 3 is not used, or is used as an auxiliary, whereby the image signal which is inputted from the line sensor and which is AD-converted is converted to a digital RGB signal by the controller 6 and is directly outputted.

Further, the controller 6 has built therein a microcomputer of high-speed RISC (REDUCED INSTRUCTION SET COMPUTER) type (hereinafter, referred to as "microcomputer of RISC type"), for example. Such microcomputer of RISC type is utilized whereby it is made possible that the controller 6 is formed almost only by a RISC microcomputer.

The digital RGB data directly store therein an AD conversion value, or store therein a single line of the line sensor to the memory means 3 which, thereafter, are processed in conversion by the controller 6, and are outputted as an SCSI (Small computer system interface) output signal. Naturally, control which outputs an SCSI output signal is also executed by the RISC microcomputer whereby it is unnecessary to use an SCSI controller, which is expensive. Further, if the RGB signal is connected directly to the printer, it is possible that the fetched image data are directly outputted to the printer at high resolution.

Various embodiments of the invention, which have the above-described features or characteristics will be described in detail by the use of the drawings.

Figure 2:
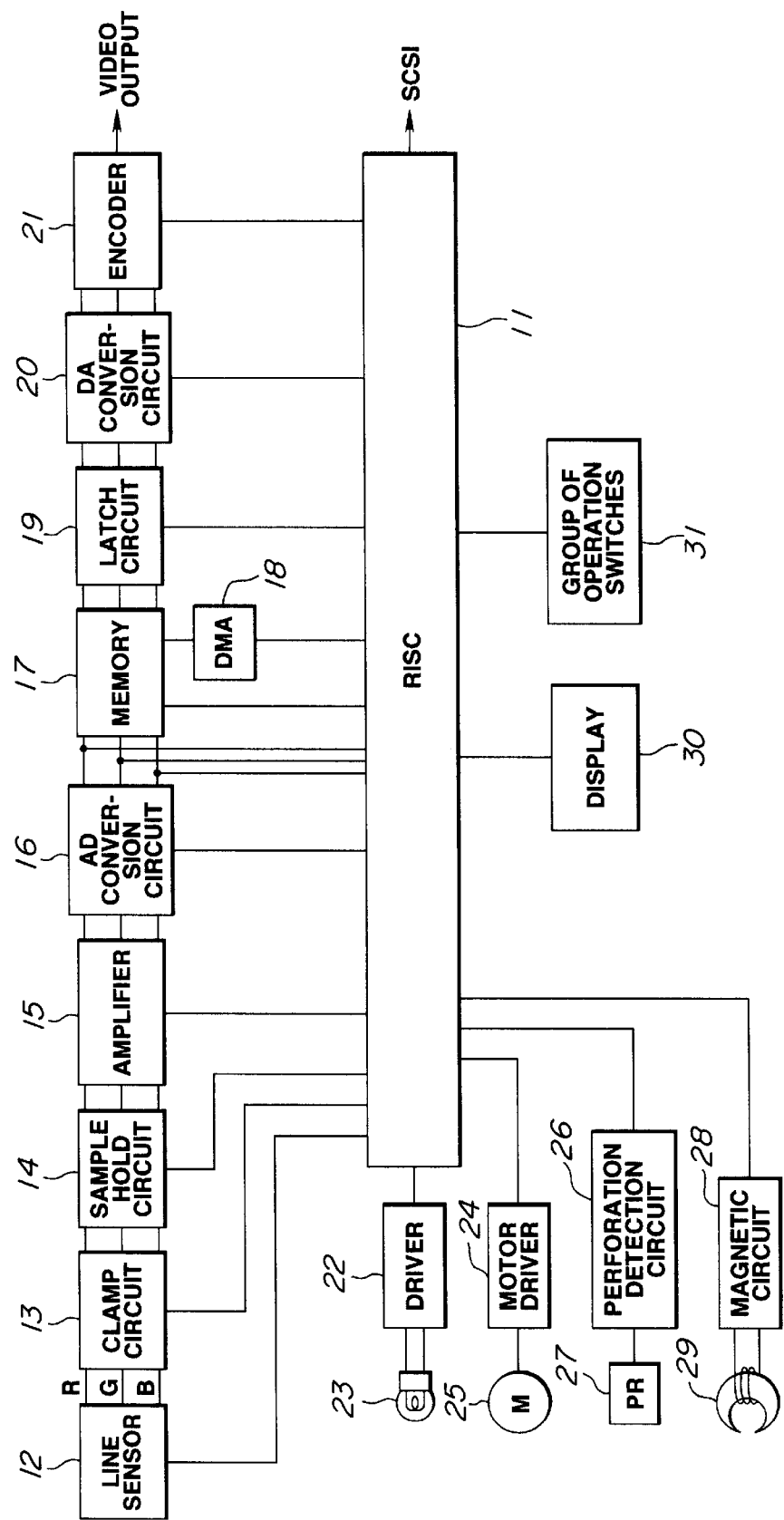
FIG. 2 is a block diagram arrangement view of a scanner device, showing a first embodiment of the invention.

FIG. 2 is a block diagram showing a scanner device according to a first embodiment of the invention.

Control of the entire scanner device according to the embodiment is executed by a high-speed microcomputer of RISC type, which servers as a controller. Of course, the controller may be formed by a custom gate array. However, if the microcomputer of RISC type is used, it is possible to reduce the number of ICs used so that an arrangement is simplified. Naturally, if there exists a RISC microcomputer which contains the other constitutional elements in the block diagram arrangement view in FIG. 2, constitutional element portions are incorporated in the RISC microcomputer, whereby it is possible to reduce the number of arrangement blocks.

Moreover, as a line sensor 12 which serves as image input means forming the present device, a line sensor of R, G and B output type is applied. As the line sensor 12, the following one or the like (line sensor MN3671A manufactured by Matsushita Denki Sangyo Kabushiki Kaisha, for example) is used. That is, a sensor is used in which an output line thereof is separated into three lines including R, G and B. Alternatively, a sensor is used which is formed by a single line, and R, G and B are outputted in regular order. Alternatively, a sensor is used which is formed by two lines. One line is used for providing a G signal, and the other line is such that an R signal and a B signal are outputted alternately.

If any kinds of line sensors are applied, it is only different from each other in address and timing which are stored in an image memory 17 to be described subsequently.

In connection with the above, in the scanner device according to the present embodiment, image input of a developed image which is photographed onto a silver salt film will subsequently be described. However, since image input from a print image is also technically the same level, it is possible that the image input from the print image is also realized by a scanner device having an arrangement similar to that of the present device.

Subsequently, flow of a signal in a case where video signal processing is executed in which output is executed to a domestic TV monitor by the present scanner device, an arrangement of the present device therefor, or the like will be described.

A film which intends to take in or fetch the image data is illuminated on the basis of indication of a microcomputer 11 of RISC type, through an illumination driver 22 driving a light source 23. A fluorescent lamp, a halogen lamp, an LEiD or the like can be applied as the light source 23.

The image data comprised of every line of the illuminated film are inputted to the line sensor 12 which forms the image input means. The R, G and B signals which are outputted from the line sensor 12 pass through a clamp circuit 13, a sample hold circuit 14, an amplifier 15, and an AD conversion circuit 16 that are digital conversion means. The R, G and B signals are converted into digital form, and are stored in the image memory 17 that is memory means. The data which are stored in the image memory 17 are successively read by a DMA (DIRECT MEMORY ACCESS) circuit 18, and every picture element is latched by a latch circuit 19. The data are DA-converted by a DA conversion circuit 20 which is the DA conversion means and, thereafter, are converted to a video signal by an encoder 21 that is an encoder means. The data are then outputted.

In connection with the above, as the video signal, any signal type including a composite signal or R, G and B signals for a video monitor is also capable of being outputted. Further, the capacity of the aforesaid image memory may be sufficient to have of the order of 200 thousand picture elements ~400 thousand picture elements, since the memory is for normal domestic monitor output.

Furthermore, the video signal may be outputted to an LCD monitor or the like. In that case, the memory may be a memory of the order of a hundred thousand picture elements.

Moreover, in the present device, it is necessary to feed the film a predetermined amount for every unit line read, in a case where the image data on the film are read by the line sensor 12. However, the feeding is executed by the fact that a film feeding motor (M) 25 is driven through a motor driver 24 which is controlled by the controller 11 of RISC type. In this connection, a stepping motor is applied as to the film feeding motor 25.

Upon feeding of the film, the film feeding motor (M) 25 is continuously rotated while the number of film frames and a frame position are identified or confirmed by a photo-reflector (hereinafter, referred to as "PR") 27 through a perforation detection circuit 26, so that feeding of the film is executed. However, in a case where the image input is executed by the line sensor 12, the motor 25 is driven in step in conformance with a read pitch.

Magnetic data such as photographic information which is magnetically recorded onto the film, and the like, are read by a magnetic head 29, and arc fetched into the microcomputer 11 of RISC type through a magnetic circuit 28. Furthermore, also in a case where the magnetic data which serve as the recording information are written to the film, the magnetic data are written through the magnetic head 29.

The number of frames during fetching of the image data, the photographic information which are read from the film, and the like are displayed on a display 30 such as an LCD or the like.

Indication of each of the operations due to the present scanner device is executed by a group of operation switches (hereinafter, a switch will be referred to as "SW") 31.

Subsequently, a flow of a signal will be described in a case where an image signal of digital RGB data, which has resolution equal to or more than 1000 thousand (i.e., one million) picture elements per single image plane, and which is high in resolution, such as those for a personal computer, is outputted.

Normally, in the aforementioned device which fetches all the image data equal to or more than 1000 thousand picture elements, into the memory, an image memory having a large or high capacity equal to or more than 1000 thousand picture elements, which is extremely expensive, is required or is necessary. The device cannot be used in view of the cost as an equipment for public welfare. In view of this, the present embodiment is arranged such that, in order to output the signal of the digital RGB data having high resolution, the above-described memory of a large capacity equal to or more than 1000 thousand picture elements is not necessary, and the image data which are fetched by the line sensor 12 are converted to the digital RGB image data by the microcomputer 11 of RISC type and are outputted.

Specifically, the R, G and B signals which are outputted from the line sensor 12 are inputted to the microcomputer 11 of RISC type through the clamp circuit 13, the sample hold circuit 14, the amplifier 15 and the AD converter circuit 16. The R, G and B signals are directly converted to an SCSI signal which is capable of being outputted to an SCSI, and are outputted. Processing is made in this manner, whereby the memory which is large or high in capacity which is required for high resolution becomes unnecessary and it is possible to reduce the required memory capacity be a level equal to or less than ½.

The line sensor 12 executes integral read every single line. The line sensor 12 drives the feed motor 25 for a single step to drive the film only by a single line, and reads the subsequent or next line. Accordingly, the arrangement may be such that a line for a single line is stored on the image memory 17 and, thereafter, is converted to an SCSI signal.

In a case where the image signal is outputted to the personal computer or the like, it is not necessary to connect the image memory 17 to the domestic television monitor. Accordingly, there is no problem if the image memory 17 is used as a buffer memory of the SCSI.

In connection with the above, the output signal type of the digital RGB image data has been described as being an SCSI output. However, the principle of data conversion operation is the same with respect also to GPIB (GENERAL-PURPOSE INTERFACE BUS which is set under the standard of IEEE and IEC (INTERNATIONAL ELECTRO-TECHNICAL COMMISSION)) and RS-232C (RS-232C INTERFACE which is set under the standard of EIA or the standard of JIS (JIS C6361)) or some other output signal type such as, for example, one for a printer port of a personal computer.

Figure 3:
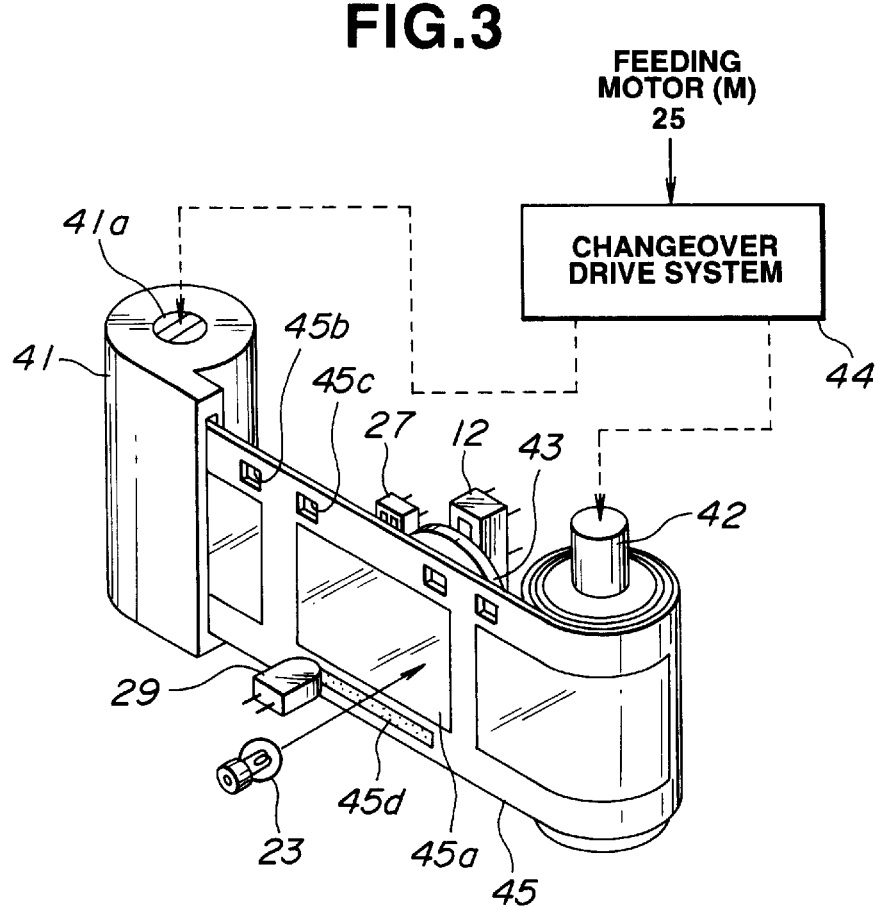
FIG. 3 is a perspective view showing an arrangement of a mechanism in the vicinity of a film feeding part of the scanner device in FIG. 2.

FIG. 3 is a perspective view showing an arrangement of a mechanism in the vicinity of a film feeding part of the scanner device according to the present embodiment.

As shown in FIG. 3, a film 45 which is fed out from a film cassette 41 is wound around a spool 42, and is driven by the film feeding motor 25 through a changeover drive system 44.

Perforations 45b and 45c open in the film 45 at upper front and rear of an image plane 45a of the film 45, as shown in FIG. 3. A feeding position of the film 45 is judged by the fact that positions of the perforations 45b and 45c are detected on the basis of variation in a reflected light, by the PR 27. In this connection, it is needless to say that a photo-interrupter (PI) in which sensors for light projection and for light receiving are placed respectively on both sides of the film 45 may be substituted for the PR 27.

Light from the light source 23 passes through the film 45. The light is permeated through an optical system 43 which is formed by a lens system, and image-forms an image in the form of a line on an image-formation face of the line sensor 12. In this connection, if necessary, an optical system or a diffusion plate may be inserted between the light source 23 and the film 45.

Further, the magnetic head 29 is abutted against a magnetic recording track 45d of the film 45, and reads photographic data recorded on the track 45d.

In connection with the above, in a case where the film 45 is rewound, the changeover drive system 44 is changed over, and a cartridge shaft 41a of the cartridge 41 is rotatively driven to execute the rewinding.

Figure 4:
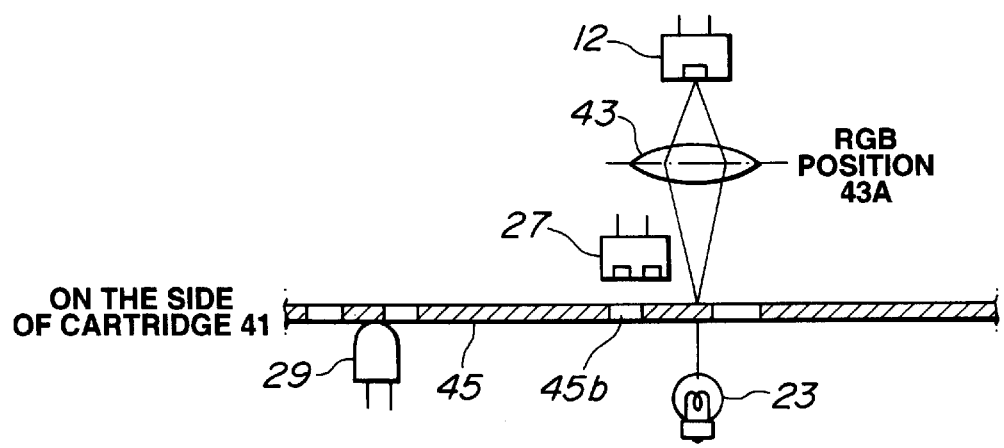
FIG. 4 is an arrangement view showing a positional relationship between a film of the scanner device in FIG. 2, and a film feeding direction of an optical system and a magnetic head, showing the optical system located at a just-focused position upon output of digital, RGB data.

FIG. 4 is an arrangement view showing the positional relationship between the film and the optical system, and the film feeding direction of the magnetic head. As shown in FIG. 4, the magnetic head 29 executes positioning toward the cartridge 41 only for about a single frame with respect to the read position of the line sensor 12 on the film 45. Moreover, the PR 27 that is a perforation detection part may detect another perforation position, if a read initiation position of the line sensor 12 can be limited.

The reason as to why the positional relationship in the feeding direction is adopted is that, since, when the image is read by the line sensor 12, it becomes, by all means, a low-speed and step-wise operation and, accordingly, the magnetic read which requires a certain measure of speed and constant speed is made difficult. In view of this, if the positional relationship is made to one described above, when the film 45 reaches the read initiation position of the line sensor 12, it is possible to already finish the magnetic reading of the corresponding frame. Accordingly, the film 45 moves at high speed and continuously until the read start position of the line sensor 12, and it is possible that the magnetic data of the frame, which are read by the magnetic head 29, cause magnetic reading to be executed prior to reading of the image plane 45A by the line sensor 12.

In the scanner device according to the present embodiment, the read state of the image data on the film is adjusted in conformance with the output type of the image data, for example, with an output state as to whether the domestic video signal is outputted or the signal of the digital RGB image data having high resolution is outputted. Accordingly, the optical system 43 is moved so that the focusing state on the line sensor 45 is adjusted.

Specifically, the state of the positional relationship shown in FIG. 4 shows the positional relationship at the time high resolution reading is executed to output the digital RGB data (output signal for the personal computer), and shows a state in which the optical system 43 is positioned at an RGB position 43A which becomes just focussed with respect to the line sensor 12.

Figure 5:
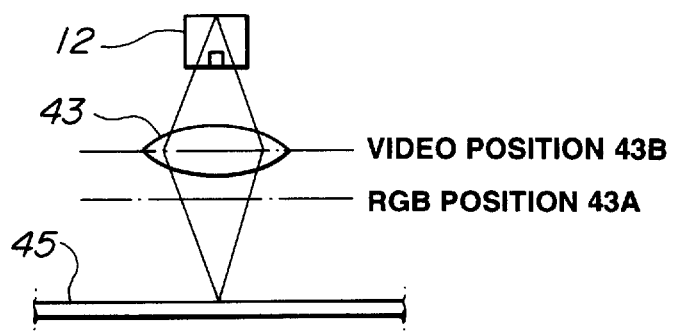
FIG. 5 is a view showing a state under which the optical system is located in a position which is shifted from the just-focused position upon output of a video signal of the scanner device in FIG. 2.

FIG. 5 is a view showing the positional relationship upon output of the video signal. The optical system 43 is shifted slightly from the RGB focussed position 43A, and is positioned at a video position 43B. The focusing is shifted in this manner, whereby, the arrangement is such that, even if the line sensor 12 executes the high speed read relatively at a coarse pitch of the film 45, no malfunction occurs.

In connection with the above, it is, of course, possible to execute also skipping-through of the line sensor 12 while it is at the just focussed state shown in FIG. 4. The image becomes slightly a step-like form. However, if this is within a tolerance, skipping-through for outputting the video signal may be executed under a state in FIG. 4.

Figure 6:
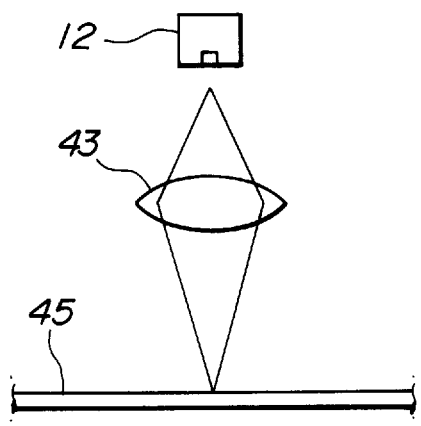
FIG. 6 is a view showing a state under which the optical system of the scanner device in FIG. 2 is located at a position which is shifted from the just-focused position.

Furthermore, the arrangement may be such that, upon output of the video signal, the line sensor 12 is moved to shift focusing, while the optical system 43 is fixed or stationary. FIG. 6 shows an arrangement state of an optical system and a line sensor of a modification thereof.

Further, a method of moving the optical system 43 and the line sensor 12 as described above may be such that a motor is used to automatically execute the movement. Of course, the movement may mechanically be executed upon changeover between the output of the video signal and the output of the digital RGB data for the personal computer.

Figure 7:
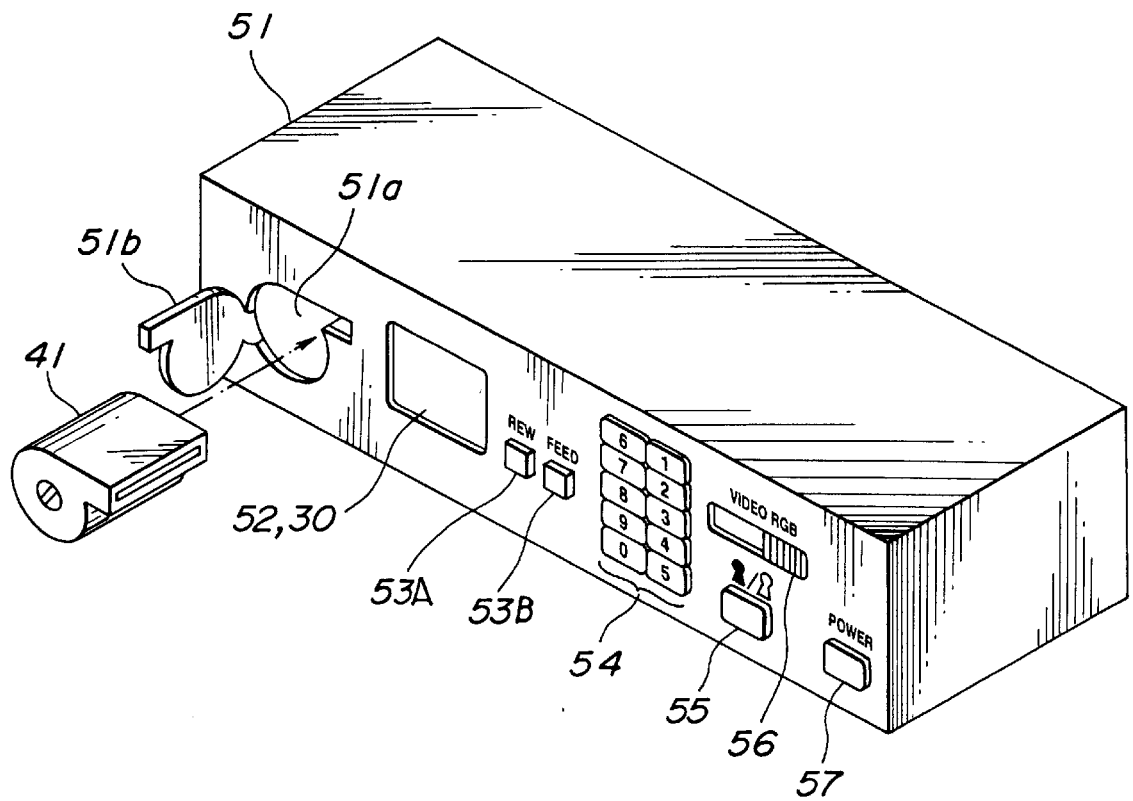
FIG. 7 is a perspective view of a housing of the scanner device in FIG. 2, showing a panel face thereof.

FIG. 7 is a perspective view of the device body showing a panel face of the scanner device according to the present embodiment.

As shown in FIG. 7, a cassette insertion opening 51a which is arranged to the left of the body panel face is an insertion opening for the film cassette 41, and a closable closure 51b is mounted thereon. Moreover, display having contents to be described subsequently is executed on an LCD display 52 which serves as the display 30. A frame return SW 53A which serves as the operation SW 31 is a switch for indicating rewinding of a single frame. A frame feeding SW 53B is a switch for indicating feeding of a single frame. A ten-key SW 54 from 1~0 is a switch for setting the target number of frames by the fact that the switch is depressed continuously.

In connection with the above, if the target number of frames is set, the film is fed automatically until the target frame is reached. Furthermore, it is needless to say that it is also possible that the frame return SW 53A and the frame feeding SW 53B continue to be pushed to execute countdown and count-up, to thereby be substituted for the ten-key SW 54 for setting the target frame.

Further, a negative/positive switch 55 is a selective SW for selecting whether the input image is negative-outputted or is positive-outputted.

Moreover, a video/RGB changeover SW 56 that is an output-mode setting means is provided. Specifically, when the switch SW 56 is changed over (i.e. moved) toward the video end, image data are inputted from the line sensor relatively at high speed, and setting is made to the video output mode which video-outputs the data which are stored in the image memory. When the switch is changed over toward the RGB end, the image data of high resolution are inputted at relatively low speed, and setting is made to the digital output mode which SCSI-outputs the digital RGB data.

A power switch SW 57 is a power-source switch for the present scanner device.

Figure 8:
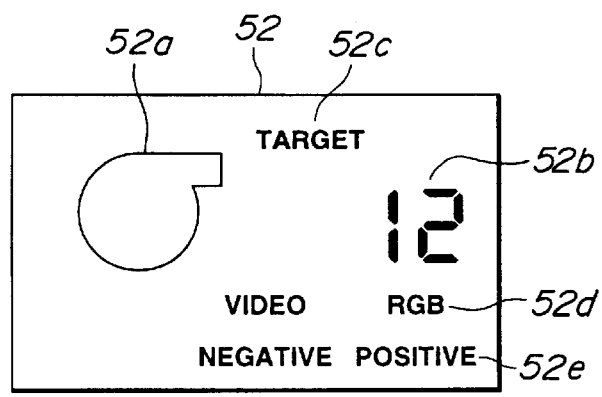
FIG. 8 is a view showing a display example of an LCD display of the scanner device in FIG. 2.

FIG. 8 is a view showing a display example of the LCD display 52.

A cassette mark 52a shown in FIG. 8 is turned ON and OFF (i.e. is flashed) when the cassette 41 does not enter to urge insertion of the cassette 41. The number of frames 52b shows the number of frames at present. The "target" display 52c is displayed as setting the target frame. At that time, the target number of frames is displayed on the number of frames 52b. When the film 45 is driven in the feeding direction toward the target, the number of frames 52b is changed to the number of frames at present. The number of frames is changed toward the target.

The "video" legend is displayed on a video-RGB display 52d when it is a video output mode. "RGB" is displayed when it is a digital RGB output mode for a personal computer. The "negative" legend is displayed on a negative-positive display 52e upon a negative output mode, while "positive" is displayed upon a positive output mode.

The image processing of the scanner device according to the present embodiment, arranged as described above will hereunder be described with reference to a flow chart in FIG. 9 or the like.

Figure 9:
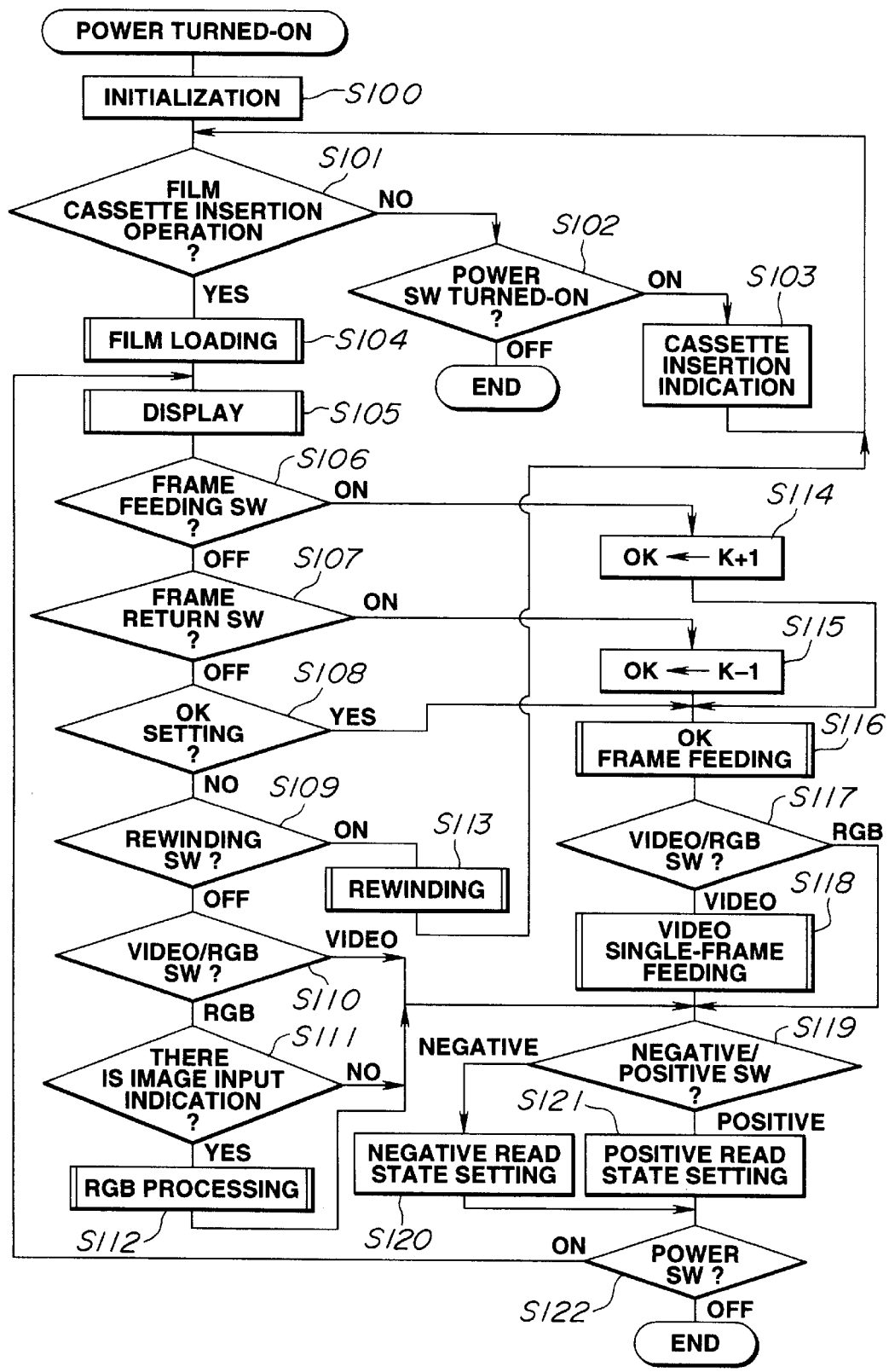
FIG. 9 is a flow chart of "image processing" that is a main routine of the scanner device in FIG. 2.

FIG. 9 is a flow chart of a main routine (power turned-ON) in a case where the present scanner device is formed by a RISC microcomputer. Processing in FIG. 9 starts in keeping with turn on of the power SW 57.

Specifically, when the power SW 57 is turned ON, initialization is first executed (Step S100).

Subsequently, it is checked whether or not the film cassette 41 is inserted (Step S101). This check may be such that the switch is set to work in interlocking with operation of the closure 51b for the cassette insertion opening 51a, or it is directly detected that the cassette 41 is inserted.

In a case where the film cassette 41 is not entered, the power SW 57 is checked (Step S102). If the power SW 57 is turned OFF, the present processing ends. If the power SW 57 is turned ON, the cassette insertion display, that is, the cassette mark is turned ON and OFF, to wait until the cassette is inserted (Step S103).

When the cassette 41 is inserted, the "film loading processing" of the subroutine which executes loading of the film 45 until a first frame is executed (Step S104).

Subsequently, the present state is displayed on the LCD display 52 (Step S105).

Subsequently, the frame feeding switch SW 53B is checked (Step S106). If the feeding SW 53B is turned ON, the number in which one is added to the present number of frames K is substituted with respect to the target number of frames OK (Step S114). "OK the frame feeding processing" subroutine to be described later is executed (Step S116).

Subsequently, the frame return switch SW 53A is checked (Step S107). If the frame return switch SW 53A is turned ON, the present number of frames K−1 is substituted to the target number of frames the OK (Step S115). "OK frame feeding processing" subroutine is then executed (Step S116).

Subsequently, it is checked whether the target number of frames OK is set (Step S108). If the target number of frames OK is set, the "OK frame feeding processing" of the subroutine is executed (Step S116). If the target number of frames OK is not set, the program proceeds to Step S109 and subsequent Steps to be described subsequently.

After the "OK frame feeding processing" subroutine is performed, it is checked whether it is the video output mode or the digital RGB output mode (Step S117). If it is the video output mode, "video single-frame feeding processing" of the subroutine to be described subsequently is executed, to output a video signal (Step S118). If it is the RGB processing mode, no processing is executed, and the program jumps to Step S119.

In Step S109, the state of the rewinding SW is checked. In a case where the rewinding SW is depressed, the film is rewound (Step S113), and the program is returned to Step S101.

Moreover, in a case where the rewinding SW is not depressed, the program proceeds to subsequent Step S110. It is checked whether it is the video output mode or the RGB mode (Step S110). If it is the video output mode, the program jumps to Step S119 to be described later. If it is the digital RGB output mode, the program proceeds to Step S111.

In Step S111, it is checked whether or not there is an image input indication. If there is no image input indication, the program proceeds to Step S119. In a case where there is an image input indication, the image data are SCSI-outputted at high resolution by "RGB processing" of the subroutine to be described subsequently (Step S112). In this connection, the image input indication is normally executed in the form of SCSI by a host microcomputer. However, the image input indication may be executed by other methods.

In Step S119, the negative/positive switch SW 55 is judged, and it is set to the respective read mode selected (Step S120 and Step S121). The state of the power SW 57 is checked (Step S122). If the power SW 57 is turned ON, the aforesaid loop is repeated. If the power SW 57 is turned OFF, the present processing ends.

Figure 10:
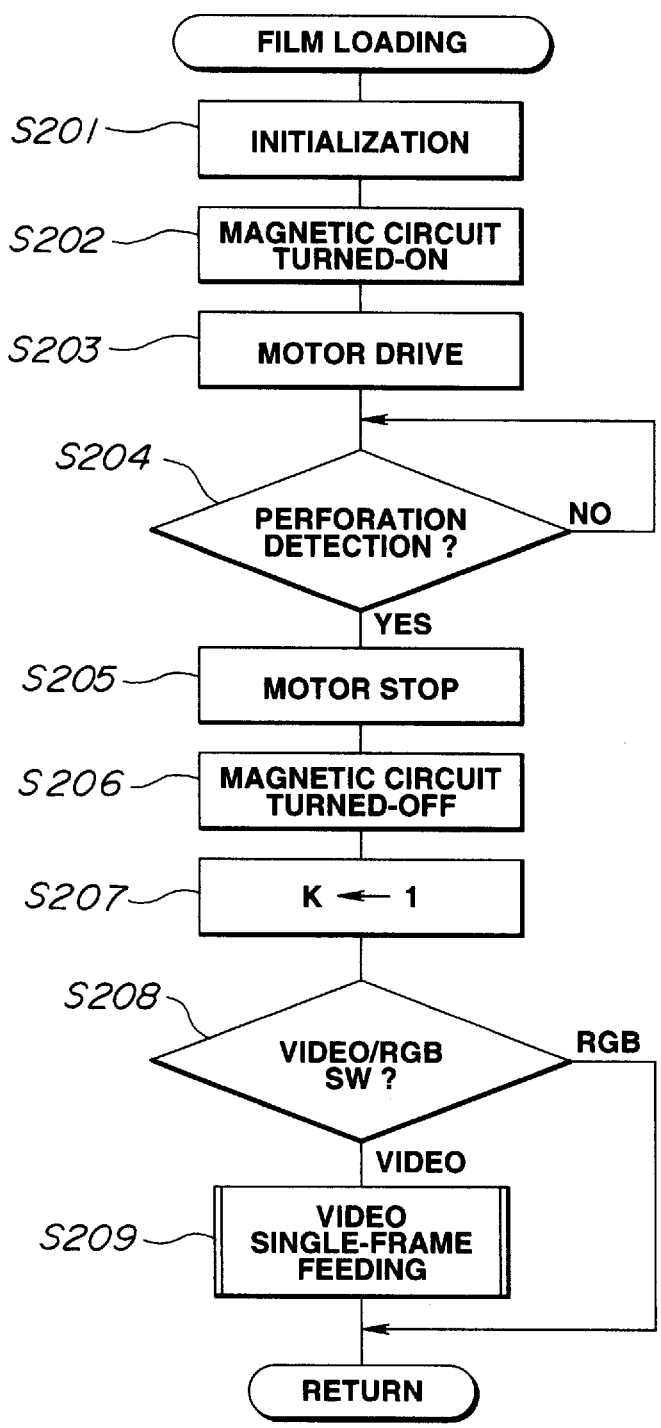
FIG. 10 is a flow chart of a "film loading processing" subroutine which is invoked at the main routine of the image processing in FIG. 9.

Subsequently, the aforementioned "film loading" processing subroutine will be described by a flow chart in FIG. 10.

First, initial operation is so executed as to be made to a state capable of feeding the film (Step S201). Subsequently, the magnetic circuit 28 is so turned ON as to be made to a state capable of reading the magnetic data on the film 45 (Step S202).

Further, the motor (stepping motor) 25 is continuously rotated. It is waited until the perforation is detected (Step S204). When the perforation is detected, the state is a state in which the film 45 is fed to the position of the first frame. The motor 25 stops, and the magnetic circuit 28 is turned OFF (Step S205, and Step S206). In this connection, the read magnetic data are stored in the RAM within the microcomputer 11 of RISC type.

Under the above-described state, the frame reaches the first frame. Accordingly, 1 is substituted into the number of frames K (Step S207), and check of the mode is executed (Step S208). In a case of the video output mode, the "video single-frame feeding processing" subroutine to be described subsequently is executed (Step S209). In a case of the digital RGB mode, the present subroutine ends as it is.

Figure 11:
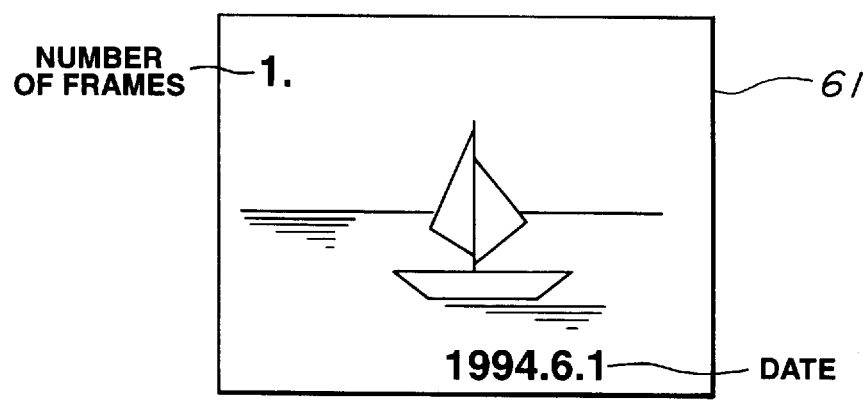
FIG. 11 is a view showing an example of an image which is outputted at a video output mode in the scanner device in FIG. 2.

FIG. 11 shows an example of an image plane which is outputted at the video output mode. An example of FIG. 11 is an example in which the number of frames and date which is read from the magnetic data together with the image data are superimposed upon an image plane 61. In this connection, the magnetic data may be displayed or may not be displayed. Moreover, in a case where shutter time, a throttle value or the like is recorded into the magnetic data, such data also may be displayed. In any case, it simply is a design problem as to whether it is superimposed upon the image plane 61, and it is possible to simply be realized by the fact that the data are overwritten to the image memory 17 by the microcomputer 11 of RISC type.

In a case of the digital RGB mode, naturally, it is possible that the personal computer fetches the magnetic data by SCSI.

Figure 12:
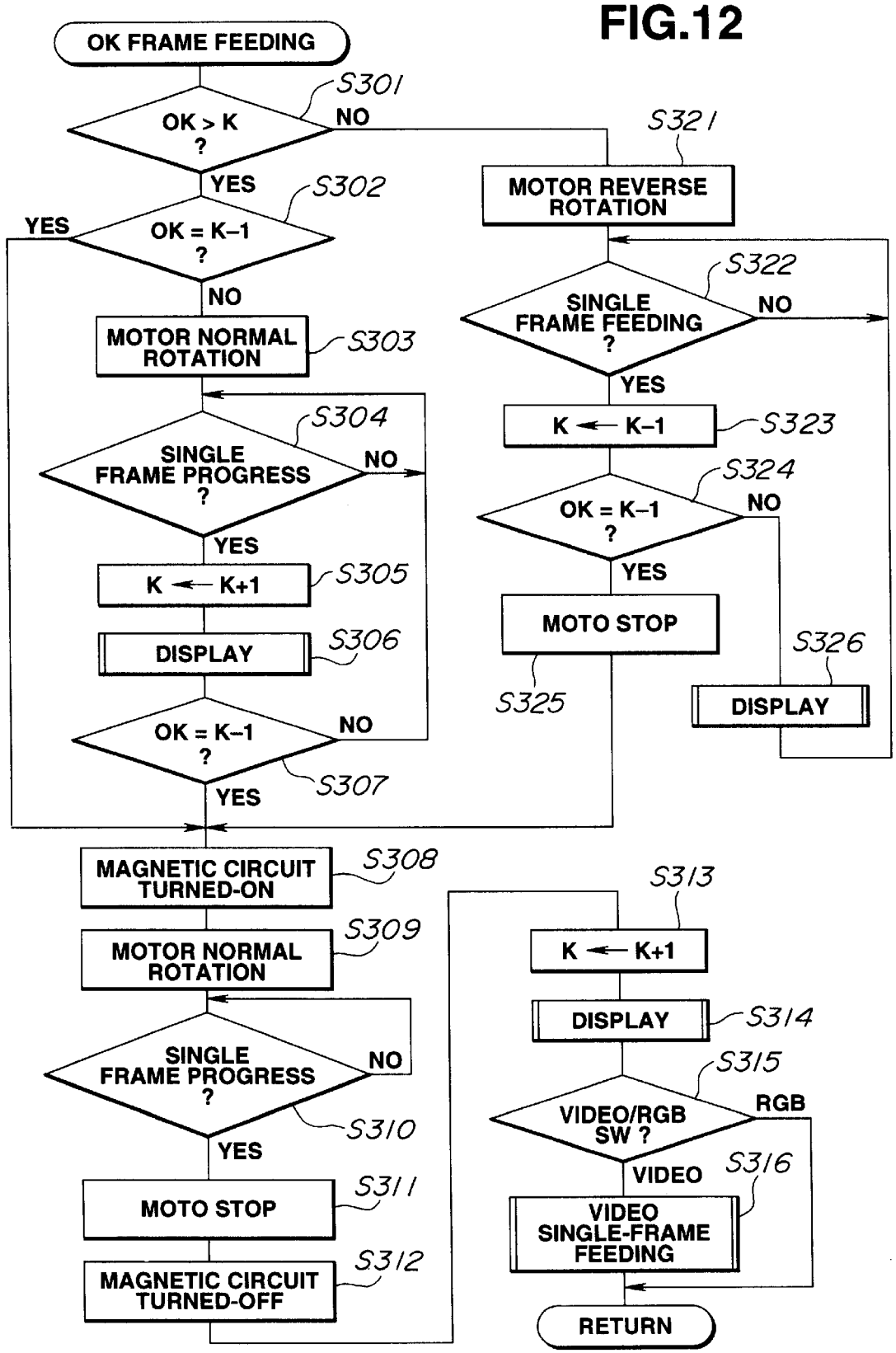
FIG. 12 is a flow chart of the "OK frame feeding processing" subroutine which is invoked at the image processing in FIG. 9.

Subsequently, the "OK (target frame) frame feeding processing" subroutine will be described by a flow chart in FIG. 12.

First, the target number of frames OK and the present number of frames K are compared with each other (Step S301). In a case of the target number of frames OK>the number of frames K, that is, in a case where the target number of frames OK is larger than the present number of frames K, the program proceeds to Step S302. In a case where the target number of frames OK is not larger than the present number of frames K, the program jumps to Step S321 to be described later.

In Step S302, it is judged whether the target number of frames=the number of frames−1, that is, OK=K−1. In a case where they are not equal to each other, the motor (stepping motor) 25 is normally rotated by continuous rotation (Step S303). In a case where they are equal to each other, the program jumps to Step S308 to be described subsequently.

In a case where a frame for a single frame progresses by the normal rotation of the motor (Step S304), the number of frames K is counted up by one, and display of the number of frames is executed (Step S305, and Step S306). Here, the number of display frames of the LCD display 52 is also counted up. Continuously, judgment of OK=K−1 is executed (Step S307), and the aforesaid processing is repeated until OK=K−1.

In a case where the target number of frames=the number of frames−1, that is, OK=K−1 is reached, the program proceeds to Step S308. Since a position is reached until one short of the target frame, the magnetic circuit 28 is turned ON. It is prepared to read the magnetic data of the target frame.

Subsequently, the motor is normally rotated. If the motor progresses through a frame for a single frame, the motor stops. The magnetic circuit is turned OFF (Step S309, Step S310, Step S311 and Step S312). Thus, the magnetic data of the target number of frames OK are stored in the RAM of the microcomputer 11 of RISC type by the processing until now.

Subsequently, a single counting-up of the number of frames K is executed, and display is executed (Step S313 and Step S314). This means that the film is fed to an image read preparation position of the target number of frames.

Subsequently, check of the mode is executed (Step S315). If the mode is the RGB mode, the present routine ends as it is. The state becomes a state of the image input indication wait. If the mode is a video output mode, the "video single-frame feeding" subroutine is executed. A video signal is outputted, and return is executed.

In a case where it is judged in the judgment in first Step S301, it is not that the target number of frames OK>the number of frames K, the program jumps to Step S321. However, the motor is reversely rotated at that time. In a case where the film is returned by a frame for a single frame, the number of frames K counts down by one (Step S322 and Step S323). Here, in a case where it is not the target number of frames=the number of frames−1, that is, OK=K−1, display thereof is executed. The processing is repeated until it becomes OK=K−1 (Step S324 and Step S326).

In connection with the above, the reason why rewinding is executed until the target number of frames=the number of frames−1, that is, OK=K−1 is that there is necessity to read the magnetic data. In a case where the magnetic data are not read, return may only be executed until the target number= the number of frames, that is, OK=K. In such case, the program may jump to Step S314 after stop of the motor.

Subsequently, the motor stops after the rewinding step is executed until the target number of frames=the number of frames−1, that is, OK=K−1 (Step S325), and processing which is the same as that upon normal rotation of the motor is executed. Here, since display is not executed when OK=K−1, no uneasy or anxious feeling is given to a user. In this connection, counting-down is not executed from the target number of frames OK on display. Increment of the number of frames K is executed, that is, K is made to K+1 in the processing of Step S313. However, display is not executed originally or when OK=K−1. Accordingly, display from the fact that it becomes the target number of frames is not changed.

Subsequently, "video single-frame feeding processing" of the subroutine will be described on the basis of a flow chart in FIG. 13.

First, as described in FIG. 5, the optical system 43 is moved to the video position 43B that is not the just-focussed position (Step S401). Subsequently, illumination due to the light source 23 is turned ON, and integration of the line sensor 12 is executed (Step S402 and Step S403). Integration time of the line sensor 12 is constant during image input for a single frame.

When the integration ends, sampling is executed at intervals of n, and the image data are read at high speed without the fact that all the sensors are not outputted (Step S404). Subsequently, the motor (stepping motor) 25 advances by n steps (Step S405). Here, it is supposed that the sensor pitch is the same as the pitch through which the film is moved by the stepping motor.

It is checked whether the above-described processing has ended by a frame for a single frame (Step S406). In a case where the image has been inputted for a single frame, the illumination due to the light source 23 is turned OFF (Step S407). Here, although not expressed in the flow, the input image which is stored in the image input is outputted as the video signal by the DMA 18. At this time, the output is executed in conformance with the negative/positive mode.

Subsequently, the motor 25 is driven. The film is returned through a frame for a single frame in order to return the film frame to the frame display position. The motor 25 stops (Step S408, Step S409 and Step S410). The processing of the present subroutine ends. Accordingly, the frame display and the film position are not always inconsistent with each other.

Subsequently, "RGB processing" of the subroutine will be described by a flow chart in FIG. 14.

Figure 13:
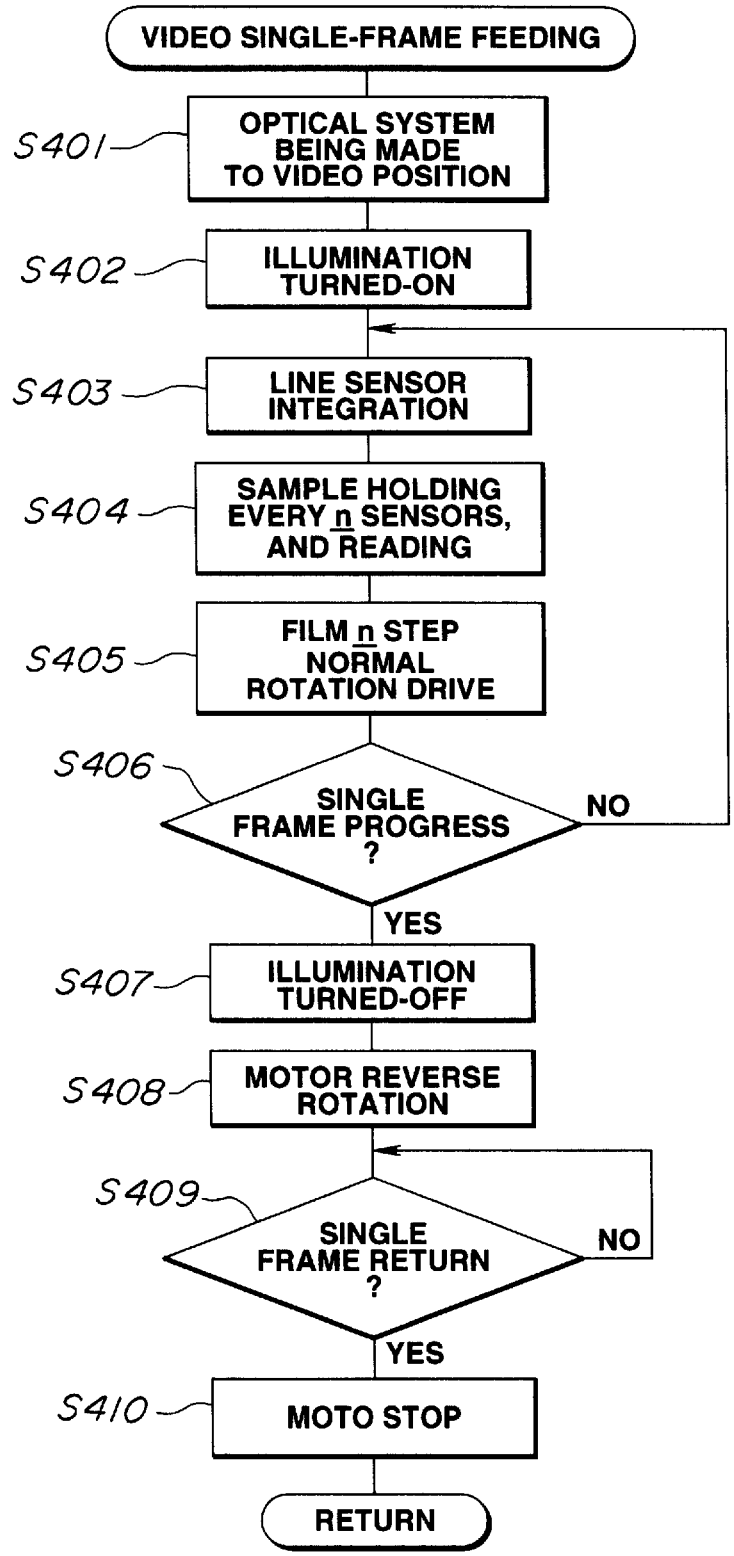
FIG. 13 is a flow chart of the "video single-frame feeding processing" subroutine which is invoked at the image processing in FIG. 9.
Figure 14:
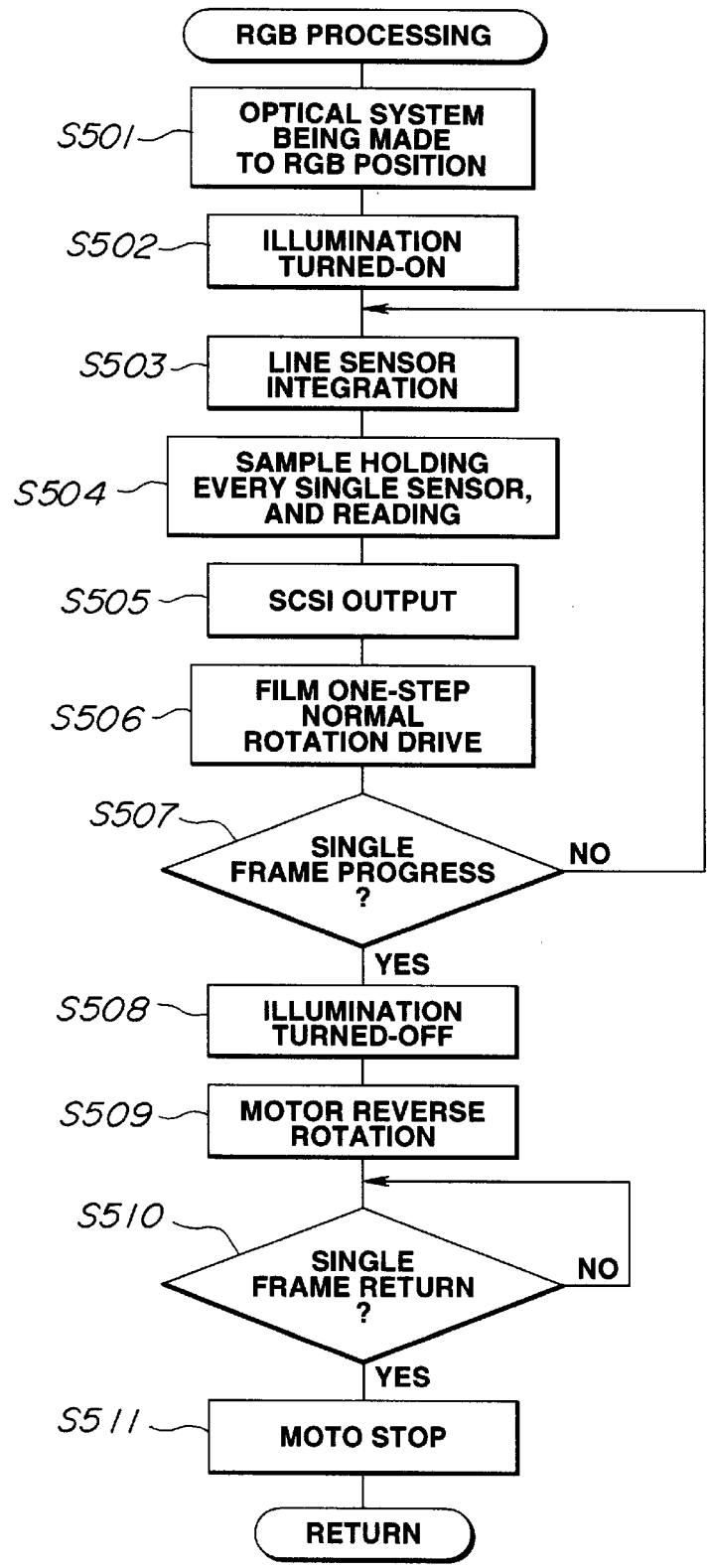
FIG. 14 is a flow chart of the "RGB processing" subroutine which is invoked at the image processing in FIG. 9.

A point in which processing from Step S501 to Step S511 in FIG. 14 is different from "video single-frame feeding processing" in FIG. 13 is that the optical system 43 is moved to the RGB position 43A (Step S501), to be in the just focussed state, the motor 25 that is the stepping motor is also driven every single step so that all the image data are read by the line sensor 12 (Step S506), and the image data having the best resolution are outputted to the SCSI (Step S505).

Time is taken more or less for the present RGB processing. Since, however, the SCSI output is executed every single line, it is possible to output the image data having high resolution, by a smaller buffer memory. It is possible to handle also the negative/positive data conversion as a series of processings.

As described above, the scanner device according to the present embodiment has a smaller memory capacity, in spite of the fact that the digital RGB data having high resolution can be outputted and, further, can output also the video signal on the basis of the analog signal. Moreover, since a microcomputer of RISC type is applied as the controller, the arrangement of the controller part is made simple. Furthermore, it is possible to SCSI-output the digital RGB data. Thus, the generality is high.

Subsequently, a scanner device according to a second embodiment of the present invention will be described.

Figure 15:
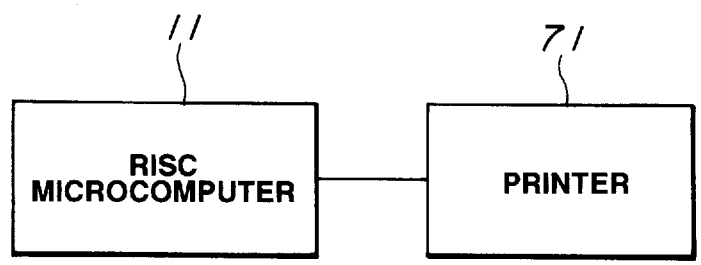
FIG. 15 is a block diagram arrangement view showing a connection state between a microcomputer and a printer in a scanner device, showing a second embodiment of the invention.

As shown in a block diagram arrangement view of FIG. 15, the scanner device according to the present embodiment is the embodiment of a scanner device of printer built-in type, arranged such that, in addition to the arrangement in FIG. 2 showing the device according to the first embodiment, an SCSI output of the microcomputer 11 of RISC type is directly connected to a printer 71.

Figure 16:
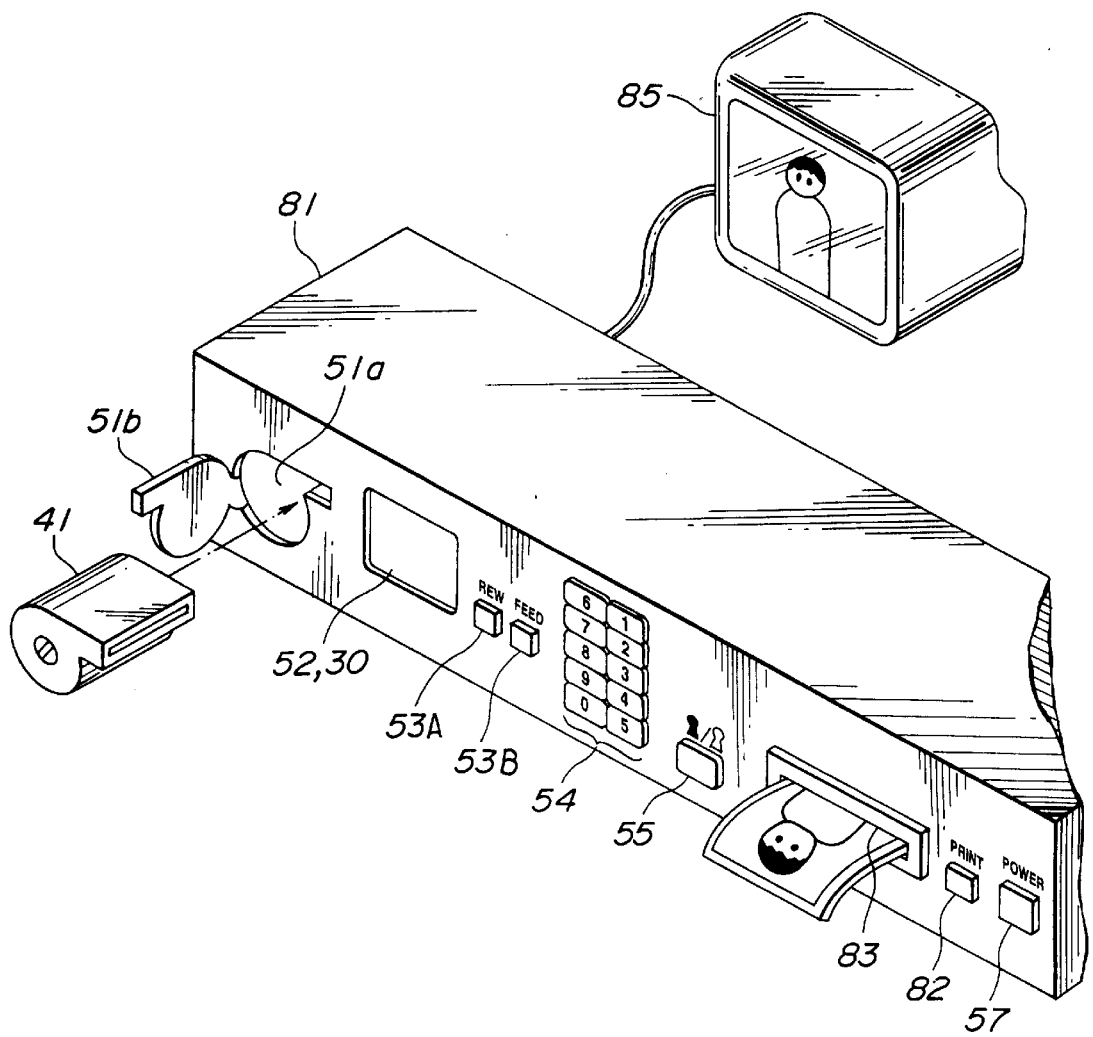
FIG. 16 is a perspective view showing an outer appearance of a housing and a monitor of the scanner device in FIG. 15.

FIG. 16 is a perspective view as viewed from the side of a panel face of the scanner device according to the present embodiment. A point which is different from the panel face in FIG. 7 is that a device body 81 has no video/RGB changeover SW 56, but a print SW 82 is arranged, and a print emission or outlet port 83 is provided. Further, the scanner device has a video-signal output terminal. It is possible to confirm the image by a domestic monitor 85 prior to printing. In this connection, in FIG. 16, the same or identical reference numerals are also applied to elements or members which are the same as or identical with those which are arranged on the panel face in FIG. 7.

Figure 17:
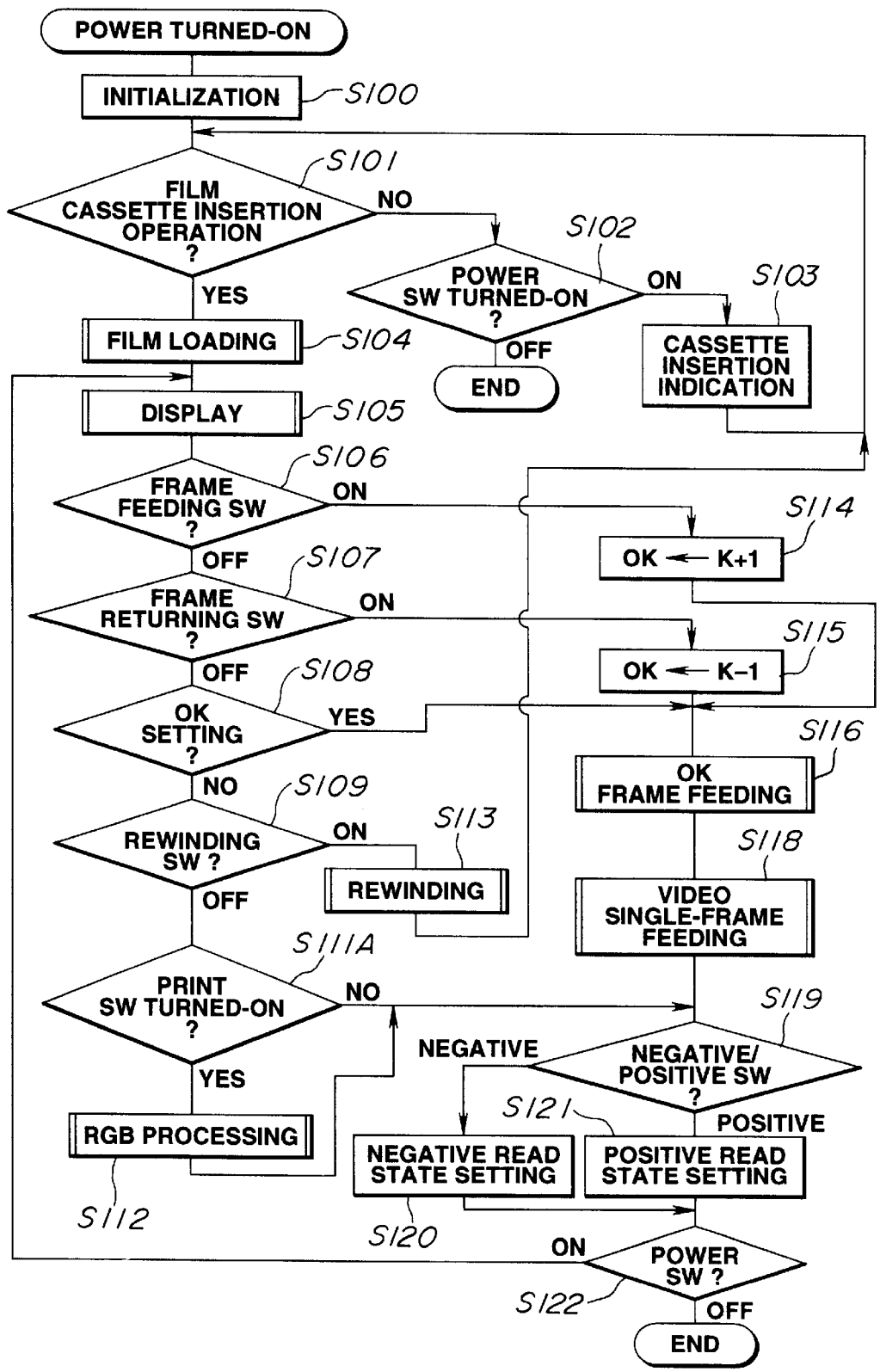
FIG. 17 is a flow chart of a main routine of image processing (power turned-ON) of the scanner device in FIG. 15.

FIG. 17 is a flow chart of a main routine (power turned ON) of the scanner device according to the present embodiment.

A point which is different from the flow chart in FIG. 9 is that, in a case of the present embodiment, since the monitor output is always executed, and it is necessary to execute confirmation or identification of the image, the judgment of the indication due to the video/RGB changeover SW in Step S110 and Step S117 is eliminated, and judgment is added as to whether the print SW 82 is turned ON in Step S111A, in place of the judgment of the image input indication in Step S111. The subroutine which is invoked in Step S104, Step S11B and Step S112 is partially different therefrom. The other steps are the same as those in FIG. 9.

Figure 18:
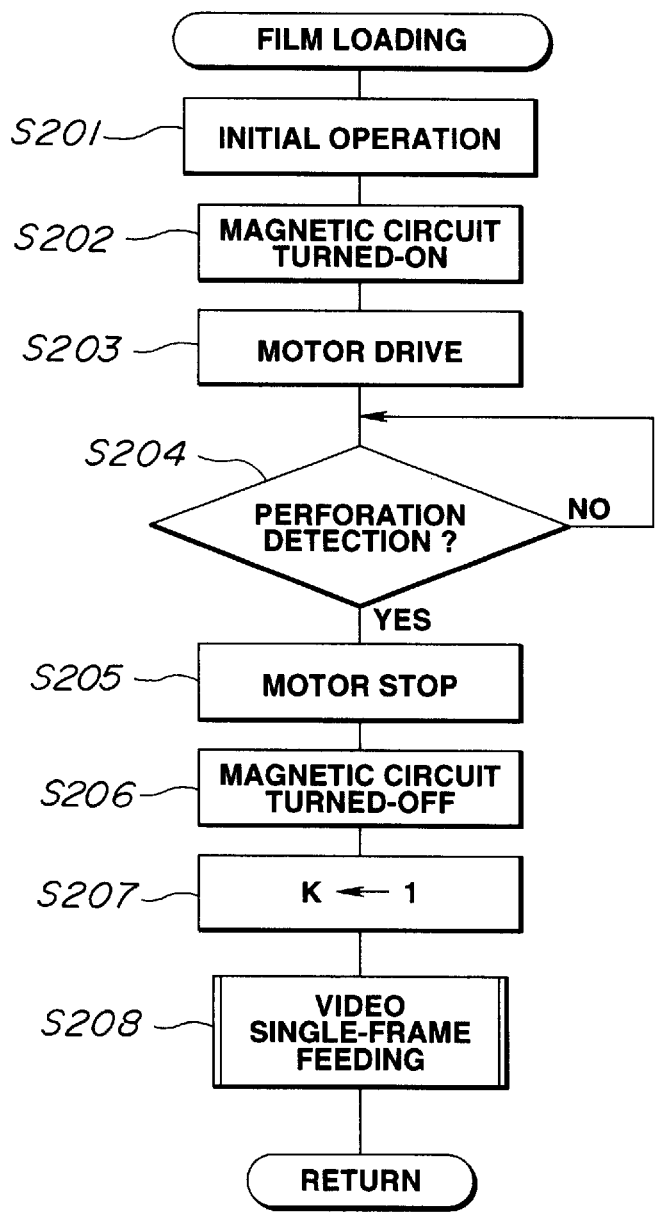
FIG. 18 is a flow chart of a "film loading processing" subroutine which is invoked at image processing in FIG. 17.

FIG. 18 is a flow of "film loading" of a subroutine in the device according to the present embodiment. A point at which the present subroutine is different from the routine in FIG. 10 of the first embodiment is that the judgment of the video/RGB changeover SW in Step S208 is similarly eliminated, and monitor display can always be executed.

Figure 19:
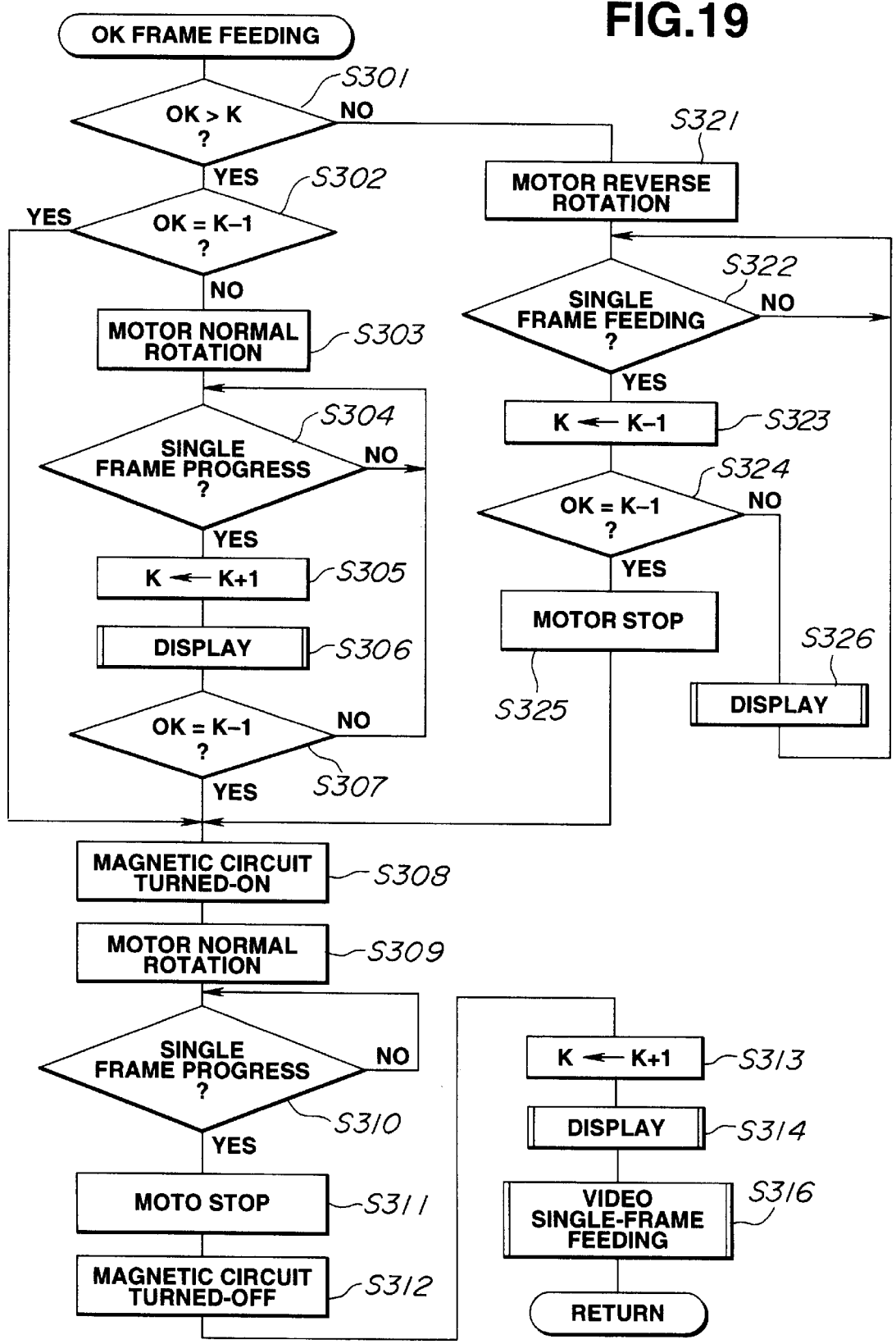
FIG. 19 is a flow chart of the "OK frame feeding processing" subroutine which is invoked at the image processing in FIG. 17.

Further, FIG. 19 is a flow diagram of the "OK frame feeding processing" subroutine in the device according to the present second embodiment. A point at which the present subroutine is different from the routine in FIG. 12 of the first embodiment is that judgment of a video/RGB changeover SW in Step S315 is similarly eliminated.

Figure 20:
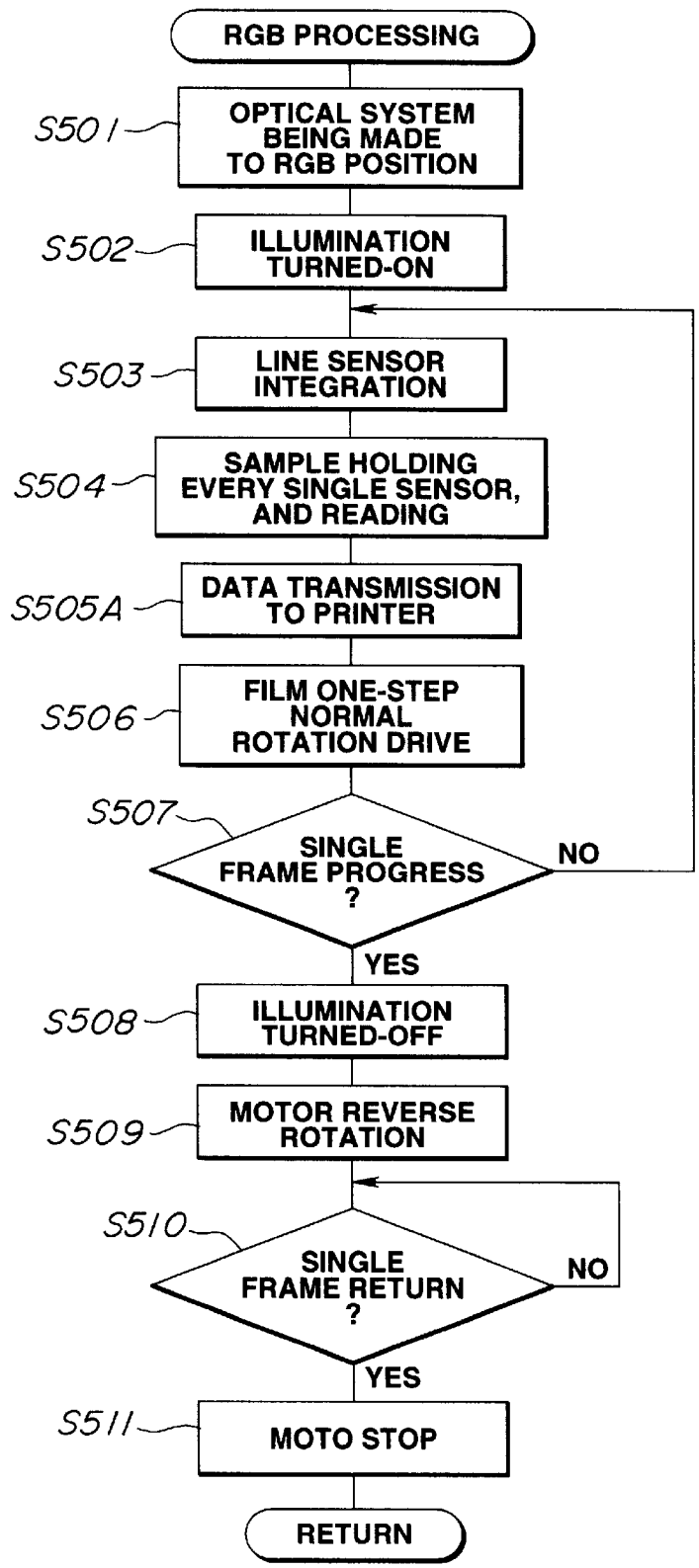
FIG. 20 is a flow chart of the "RGB processing" subroutine which is invoked at the image processing in FIG. 17.

Moreover, FIG. 20 an "RGB processing" subroutine in the device according to the present embodiment. A point which is different from the routine in FIG. 14 of the first embodiment is only that SISC output in Step S505 becomes processing to transmit data to a printer in Step S505A.

In connection with the above, the "video single-frame feeding" subroutine in the scanner device according to the present embodiment is the same as that of the routine in FIG. 13 of the first embodiment, and it is not particularly shown.

In connection with the above, in the device according to the present embodiment, the stepping motor is adopted for the film feeding motor 25 and is used in common thereto for the scanning of the line sensor. However, it is needless to say that, even if the feeding motor 25 is a DC motor, while, another stepping motor is used as one for line-sensor scanning for directly moving the line sensor, it is not different therefrom technically.

What is claimed is:

1. A scanner device comprising:
   image input means including a line sensor for converting an image on a developed film, to an image signal, for inputting the image signal of said film image, while shifting a relative positional relationship between said line sensor and said film;
   AD conversion means for converting said image signal which is outputted from said image input means into digital form;
   memory means for storing therein a digital conversion signal of said image signal which is outputted by said AD conversion means;
   encoder means for converting said digital conversion signal which is stored in said memory means into a video signal; and
   RGB-data output means for externally outputting RGB-data from said image input means on the basis of said image signal for every single line of said line sensor, whereby said RGB data outputs digital RGB data having a number of picture elements which is greater than a number of picture elements which is capable of being stored in said memory means without intervening of said memory means, or by an auxiliary utilization of said memory means.

2. A scanner device according to claim 1, wherein said RGB-data output means comprises a RISC microcomputer.

3. A scanner device according to claim 1, wherein said RGB-data output means has an output part thereof which is an SCSI.

4. A scanner device according to claim 1, wherein said RGB data from said RGB-data output means are outputted to an external personal computer.

5. A scanner device according to claim 1, wherein said RGB data from said RGB-data output means are outputted to a printer device.

6. A scanner device according to claim 1, including:
   detection means for detecting a perforation in said developed film, and a film feeding mechanism for feeding said film on the basis of an output from said detection means.

7. A scanner device according to claim 1, wherein said image input means comprises illumination means for illuminating said developed film, which is provided on a side opposite to a side of said line sensor, and a film feeding mechanism for stepwise feeding of said film past said line sensor.

8. A scanner device according to claim 1, including:
   a magnetic circuit for reading data recorded onto a magnetic recording section provided on said film.

9. A scanner device comprising:
   film drive means for feeding a film;
   image input means including a line sensor for converting an image on said film to an image signal;
   setting means for setting a mode of a video output mode for outputting, in video, an image which is inputted by said image input means and a digital output mode for executing a digital output for a personal computer or a printer;
   means for outputting in video when a frame is moved (frame feeding and returning); and
   control means for executing control such that, in a case where said video output mode is set by said setting means, a sensor output of said line sensor is thinned out to read the image, and driving of said line sensor is stepped coarser than resolution to input said image, and, in a case where said digital output mode is set, an output from said line sensor is provided for every picture element, and driving of said line sensor is stepped more minutely to input said image,
   whereby a signal which is outputted provides that resolution respectively required for the video output mode and digital output mode.

10. A scanner device according to claim 9, wherein upon said video output mode, a focal point of an optical system of said line sensor is loosened as compared with that upon said digital output mode.

11. A scanner device according to claim 9, including:
    a magnetic circuit for reading data which are recorded on a magnetic recording part which is provided on said film.

12. A scanner device according to claim 11, wherein a magnetic head which is provided as part of said magnetic circuit is located near a cartridge for a single frame of the film of the scanner device.

13. A scanner device according to claim 11, wherein data recorded onto the magnetic recording part which is provided on said film are read by said magnetic circuit, during running of said film.

14. A scanner device comprising:
    image input means including a line sensor, for converting an image to an analog image signal;
    drive means for shifting a relative positional relationship between said line sensor and a film;
    image conversion means for converting the image for a single frame, to an analog image signal while the relative positional relationship between said line sensor and said film is shifted by said drive means;
    means for outputting in video when a frame is moved (frame feeding and returning); and encoder means for executing conversion to a video signal, on the basis of the analog image signal which is converted by said image conversion means.

15. A scanner device according to claim 14, comprising:

AD conversion means for converting the analog image signal which is inputted by said image input means, to digital image data, image memory means for storing therein the digital image data which are converted by said AD conversion means; and DA conversion means for converting said digital image data which are stored by said image memory means, to an analog signal, wherein said encoder means executes conversion to said video signal on the basis of said analog signal which is converted by said DA conversion means.

16. A scanner device according to claim 15, comprising:

processing means for converting said digital image data to RGB image data.

17. A scanner device according to claim 16, comprising:

an operation member for selecting one of said video signal and said RGB image data, to output the same.

18. A scanner device according to claim 16, comprising:

display means for displaying which of said video signal and said RGB image data is outputted.

19. A scanner device according to claim 14, comprising processing means for executing processing to RGB image data wherein the processing means comprises a RISC microcomputer.

20. A scanner device comprising:

image input means including a line sensor, for inputting an image on a developed film;

memory means including means for thinning out data which are inputted by said image input means and storing the thinned out data for a single image plane;

encoder means for executing conversion to a video signal, on the basis of the data which are stored in said memory means; and a controller for outputting, in digital form, data which are inputted by said image input means, a number of picture elements which is greater than a number of picture elements which is capable of being stored in said memory means without intervening of said memory means or by a partial utilization thereof.

21. A scanner device according to claim 20, wherein said controller comprises a RISC microcomputer.

22. A scanner device according to claim 20, wherein said digital output is outputted to a personal computer.

23. A method for processing an image on a developed film, said method comprising the steps of:

(a) scanning an image on a developed film on a line by line basis;

(b) converting each line scanned into an analog image signal;

(c) converting the analog image signal into a digital signal;

(d) storing the digital signal in a memory;

(e) converting the digital signal stored in the memory into a video signal for a display output mode; and (f) outputting in video when a frame is moved (frame feeding and returning; and (g) generating RGB-data for each scanned line of the image independently of and in addition to the digital signals stored in memory, the RGB-data having a number of picture elements which is greater than the number of picture elements stored in the memory, and which do not include the picture elements stored in memory for a digital output mode.

24. The method of claim 23 further comprising:

(g) producing a print of said image based on said RGB data.

25. The method of claim 23 further comprising:

(g) displaying an image upon a computer display monitor based on said RGB data.

26. The method of claim 23 further comprising:

(g) displaying an image on a conventional television monitor based on said scanned image.

27. The method of claim 23 wherein step (a) further comprises:

(a1) selecting a resolution of an optical system for sensing each line of an image and selecting a stepping distance between each line of an image being scanned according to whether a video output or a RGB output mode is selected.

28. The method of claim 27 wherein, in step (a1) the optical system is shifted to thin out an output and wherein coarser steps are made between scanned lines when a video output mode is selected and wherein an output for each element of a scanned line is provided and finer steps are made between scanned lines when an RGB mode is selected.

* * * * *

UNITED STATES PATENT AND TRADEMARK OFFICE
CERTIFICATE OF CORRECTION

PATENT NO. : 5,883,729
DATED : March 16, 1999
INVENTOR(S) : Miyazawa

It is certified that error appears in the above-identified patent and that said Letters Patent is hereby corrected as shown below:

```
Col. 1, line 55, delete "from" and insert --form--.
Col. 3, line 28, delete "comprises" and insert --comprise--.
Col. 5, line 15, after "as" delete --to--.
Col. 6, line 2, after "capacity" delete --be--.
Col. 6, line 4, delete "line sensor 12".
Col. 6, line 33, after "at" insert --an--.
Col. 7, line 12, delete "45A" and insert --45a--.
Col. 9, line 7, before " "OK" insert --The--.
Col. 9, line 12, before " "OK" insert --The--.
```

Signed and Sealed this

Twenty-fourth Day of August, 1999

Attest:

Q. TODD DICKINSON

Attesting Officer

Acting Commissioner of Patents and Trademarks